(No Model.)
J. R. VAUGHN & McHENRY JENKINS.
FOLDING HAY RAKE.
No. 605,034. Patented May 31, 1898.
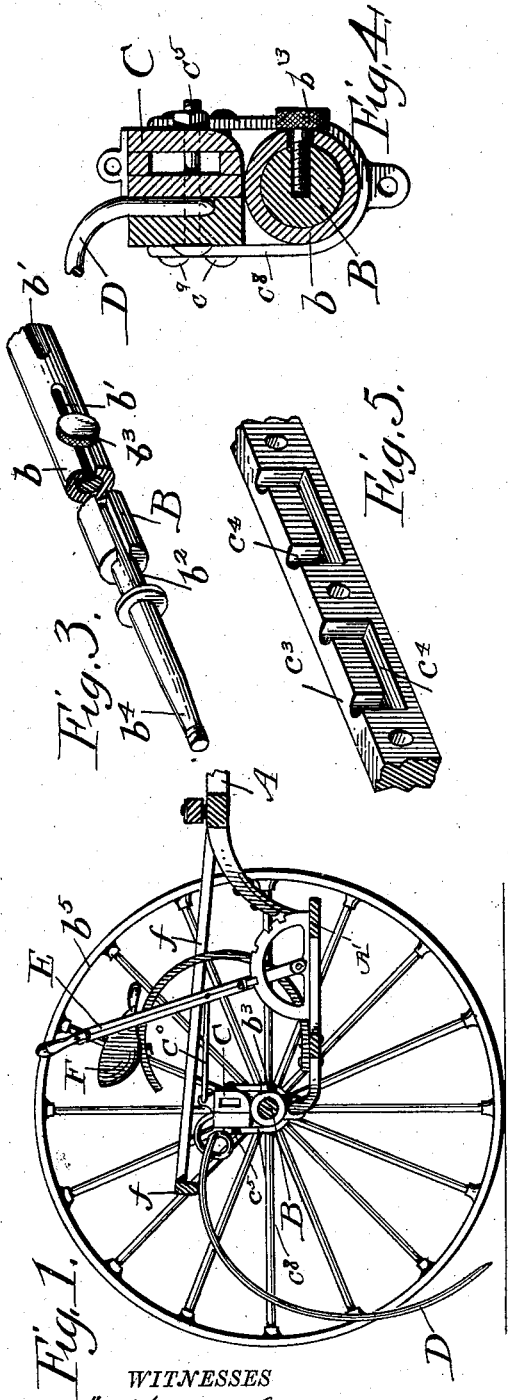
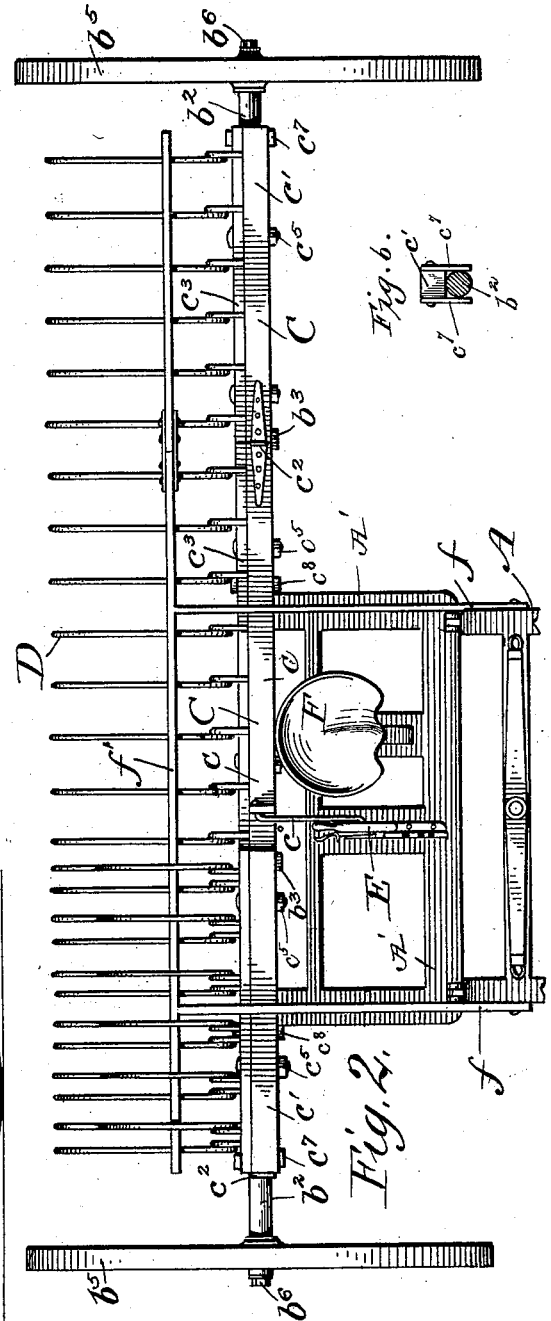
WITNESSES
J. Frank Culverwell
Henry H. Byrne
INVENTORS
James R. Vaughn,
McHenry Jenkins.
By V. D. Stockbridge
Attorney

UNITED STATES PATENT OFFICE.

JAMES R. VAUGHN AND McHENRY JENKINS, OF WALNUT SHADE, TENNESSEE.

FOLDING HAY-RAKE.

SPECIFICATION forming part of Letters Patent No. 605,034, dated May 31, 1898.

Application filed December 15, 1896. Serial No. 615,765. (No model.)

*To all whom it may concern:*

Be it known that we, JAMES R. VAUGHN and MCHENRY JENKINS, citizens of the United States, residing at Walnut Shade, in the county of Macon and State of Tennessee, have invented certain new and useful Improvements in Folding Hay-Rakes; and we do hereby declare the following to be a full, clear, and exact description of the invention, such as will enable others skilled in the art to which it appertains to make and use the same.

This invention relates to improvements in wheeled rakes, and has more particular relation to rakes that may be folded when not in use, so as to permit of their passing through narrow spaces, such as country gates and along country roads.

The invention consists of certain novel constructions, combinations, and arrangements of parts, all of which will be hereinafter more particularly set forth and claimed.

In the accompanying drawings, forming part of this specification, Figure 1 represents a central vertical section of a rake embodying our invention. Fig. 2 represents a top plan view of said rake with one end of the wheel-axle and rake-bar extended and the opposite end of said axle and rake-bar folded. Fig. 3 represents an enlarged perspective view of the telescoping axle, showing the adjusting-slots and screws therein. Fig. 4 represents an enlarged detail central vertical section through the telescoping axle and rake-bar, and Fig. 5 represents an enlarged detail perspective view of a portion of the securing-plate for attaching the rake-teeth to the rake-bar. Fig. 6 represents a section through the axle, showing the end of one of the folding rake-head sections with the pendent lugs thereon in elevation.

A in the drawings represents the thills; A', the draft-frame; B, the telescoping axle; C, the rake-bar, and D the rake-teeth. The said shafts A may be of any desired construction, whereby the draft-animals may be suitably hitched thereto. The telescoping axle B is pivotally secured to the draft-frame and comprises a tubular portion $b$, provided with adjusting-slots $b'$ $b'$ and extension portions $b^2$ $b^2$, adapted to work in the tubular portion $b$ and provided with set-screws $b^3$, that pass through the slots and into the portions $b^2$ for holding the latter in any adjusted position in the hollow portion $b$. The outer end of each of the portions $b^2$ is reduced, as at $b^4$, to receive a suitable wheel $b^5$, secured thereon by a nut $b^6$, said wheels $b^5$ being adapted to turn loosely upon the ends $b^4$. The rake-bar C comprises three square tubular sections $c$ and $c'$ $c'$, hinged together, as at $c^2$. Said section $c$ is firmly attached to the upper side of the hollow portion $b$ of the axle B by any suitable mechanism, as clips $c^3$ and bolts $c^9$. The said portions $c'$ of said rake are adapted to be folded back upon the portion $c$ when the rake is not in use and extended into a position parallel with the portions $b^2$ of the axle when the rake is to be used. Each of these sections $c'$ is provided at its outer end upon each side with a pendent lug $c^7$, adapted to lie on each side of the axle when said ends are extended, and thus hold them in position. The said rake-teeth D may be of any desired spring-loop form, either single or double, and are secured to the respective sections of the rake-bar C by plates $c^3$ $c^3$. Each of these plates $c^3$ is provided upon its inner face with a plurality of angular slots $c^4$ $c^4$, adapted to receive the ends of said rake-teeth, said plates being secured to the respective portions of the rake-bar by bolts $c^5$, passing therethrough and through said bar.

It will be observed from the foregoing description that when our improved rake is not in use the portions $b^2$ of the axle are forced into the hollow portion $b$ and the hinged section $c'$ of the rake-bar doubled back upon the section $c$, thus reducing the width of the machine about one-half and permitting of its being drawn through very narrow gateways and along very narrow country roads. When in this doubled position, the machine may also be much more conveniently stored away in the barn or stable than with it extended in its normal position. At the same time that our rake is capable of being closed into convenient form it may also be opened to the desired width for operation by simply extending the portions $b^2$ of the axle and unfolding the hinged portions $c'$ of the rake-bar.

A pivoted lever E and a seat F are attached to suitable cross-bars on the shafts, and the former is connected to the rake-bar C by a pivoted link $c^0$. This construction permits of the rake-bar being tipped to elevate the rake-teeth and discharge the hay. To assist in this discharge and clean the rake-teeth of hay, we provide the shafts with two rearwardly-extending arms $ff$, connected at their outer ends by a cross-bar $f'$. When the teeth are raised, this bar sweeps the hay impaled on the teeth from the same by passing over the upper surface of said teeth.

Having thus described our invention, what we claim as new, and desire to secure by Letters Patent, is—

1. In a horse-rake, the combination with the draft-frame, of a telescopic axle having a slotted tubular central portion pivotally connected with said frame, axle end portions adjustable lengthwise in said tubular central portion, means for holding said end portions at the desired adjustment, a sectional folding rake bar or head mounted upon said axle and having its central portion rigidly connected to the axle to rock with it and its hinged and folding end sections provided each with pendent lugs adapted to straddle and engage the telescoping end sections of the axle between them, and means mounted upon the draft-frame for rocking the rake-head and axle, substantially as described.

2. In a horse-rake, the combination with the draft-frame, of the telescopic axle, comprising the central tubular longitudinally-slotted portion and end extension portions mounted to slide in the tubular portion, securing-screws moving in the slots of the central tubular portion to engage and lock said extension portions in adjusted position, and a sectional folding rake-bar secured to said axle to rock with it, and having its folding end portions provided with pendent lugs adapted to engage the telescoping end portions of the axle on opposite sides thereof, for the purpose and substantially as described.

In testimony whereof we have signed this specification in the presence of two subscribing witnesses.

JAMES R. VAUGHN.
McHENRY JENKINS.

Witnesses:
JAS. S. SMITH,
S. E. YORK.